(12) United States Patent
Lu et al.

(10) Patent No.: US 9,594,219 B2
(45) Date of Patent: Mar. 14, 2017

(54) HERMETICALLY SEALED TELECOMMUNICATIONS ENCLOSURE WITH ADAPTER ASSEMBLY

(71) Applicants: Yu Lu, Eden Prairie, MN (US); Steven C. Zimmel, Minneapolis, MN (US); David J. Anderson, Bloomington, MN (US)

(72) Inventors: Yu Lu, Eden Prairie, MN (US); Steven C. Zimmel, Minneapolis, MN (US); David J. Anderson, Bloomington, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/995,864

(22) Filed: Jan. 14, 2016

(65) Prior Publication Data

US 2016/0209605 A1  Jul. 21, 2016

Related U.S. Application Data

(60) Provisional application No. 62/103,824, filed on Jan. 15, 2015.

(51) Int. Cl.
*G02B 6/38* (2006.01)
*G02B 6/44* (2006.01)

(52) U.S. Cl.
CPC ......... *G02B 6/3897* (2013.01); *G02B 6/3825* (2013.01); *G02B 6/4452* (2013.01)

(58) Field of Classification Search
None
See application file for complete search history.

(56) References Cited

U.S. PATENT DOCUMENTS

| 4,822,130 | A | * | 4/1989 | Maranto | G02B 6/3835 |
| | | | | | 385/138 |
| 5,013,124 | A | * | 5/1991 | Focht | G02B 6/264 |
| | | | | | 385/56 |
| 5,515,465 | A | * | 5/1996 | Olin | G02B 6/3897 |
| | | | | | 174/70 S |
| 7,686,519 | B2 | | 3/2010 | Lu | |
| 7,744,286 | B2 | | 6/2010 | Lu et al. | |
| 7,744,288 | B2 | | 6/2010 | Lu et al. | |
| 7,762,726 | B2 | | 7/2010 | Lu et al. | |
| 7,942,590 | B2 | | 5/2011 | Lu et al. | |
| 7,959,361 | B2 | | 6/2011 | Lu et al. | |
| 8,202,008 | B2 | | 6/2012 | Lu et al. | |
| 8,414,196 | B2 | | 4/2013 | Lu et al. | |
| 2014/0133804 | A1 | | 5/2014 | Lu et al. | |

* cited by examiner

*Primary Examiner* — Chad Smith
(74) *Attorney, Agent, or Firm* — Merchant Gould P.C.

(57) ABSTRACT

A fiber optic adapter assembly is provided that sealingly mounts to a telecommunications enclosure. The adapter assembly mounts to a communications enclosure such that one of two fiber optic connectors is received into the adapter assembly outside of the enclosure and the other fiber optic connector is engaged into the adapter assembly inside of the enclosure. The enclosure is pressurized at a predetermined level, and the adapter assembly is configured to maintain the pressure within the enclosure when the adapter assembly mounts to the enclosure.

16 Claims, 8 Drawing Sheets

HERMETICALLY SEALED TELECOMMUNICATIONS ENCLOSURE WITH ADAPTER ASSEMBLY

CROSS REFERENCE TO RELATED APPLICATIONS

This application claims the benefit of provisional application Ser. No. 62/103,824, filed Jan. 15, 2015, which is incorporated herein by reference in its entirety.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and an adapter for mechanically and optically coupling the fiber optic connectors together. Fiber optic connectors generally include ferrules that support the ends of the optical fibers of the fiber optic cables. The end faces of the ferrules are typically polished and are often angled. The adapter includes co-axially aligned ports (i.e., receptacles) for receiving the fiber optic connectors desired to be interconnected. The adapter includes an internal sleeve that receives and aligns the ferrules of the fiber optic connectors when the connectors are inserted within the ports of the adapter. With the ferrules and their associated fibers aligned within the sleeve of the adapter, a fiber optic signal can pass from one fiber to the next. The adapter also typically has a mechanical fastening arrangement (e.g., a snap-fit arrangement) for mechanically retaining the fiber optic connectors within the adapter. One example of an existing fiber optic connection system is described in U.S. Pat. Nos. 6,579,014, 6,648,520, and 6,899,467.

In certain examples, telecommunications enclosures or cable enclosures can typically be used to house telecommunications components in the field. The enclosures can provide interior space for receiving splice holders, optical splitters, wavelength division multiplexers, and other devices therein in a sealed manner. The enclosures can define cable ports for receiving cables of various types, such as a main cable and drop cables. Such cable ports can include sealed cable pass-through ports. Such cable ports can also include fiber optic adapters mounted to a wall of the enclosure for interfacing with the connectorized ends of fiber optic cables.

SUMMARY

In general terms, this disclosure is directed to a fiber optic adapter assembly sealingly mounting to a telecommunications enclosure and to a fiber optic connection system including a telecommunication enclosure with a fiber optic adapter assembly. In one possible configuration and by non-limiting example, the adapter assembly mounts to a communications enclosure such that one of two fiber optic connectors is received into the adapter assembly outside of the enclosure and the other fiber optic connector is engaged into the adapter assembly inside of the enclosure. The enclosure is pressurized at a predetermined level, and the adapter assembly is sealed to maintain the pressure within the enclosure.

The above features and advantages and other features and advantages of the present teachings are readily apparent from the following detailed description of the best modes for carrying out the present teachings when taken in connection with the accompanying drawings.

DETAILED DESCRIPTION

Various embodiments will be described in detail with reference to the drawings, wherein like reference numerals represent like parts and assemblies throughout the several views.

Referring to FIGS. 1-8, various examples of a fiber optic cable adapter assembly in accordance to the principles of the present disclosure. The adapter assembly is configured to couple two fiber optic connectors (e.g., a first fiber optic connector 104 and a second fiber optic connector 106). As described herein, the adapter assembly mounts to a communications enclosure such that the one of the two fiber optic connectors is located outside of the enclosure and the other fiber optic connector is located inside of the enclosure. The enclosure is pressurized at a predetermined level. In at least some examples, the enclosure is pressurized at a level greater than the environment outside the enclosure. The adapter assembly is configured to maintain the pressure within the enclosure. In some examples, the pressure inside of the enclosure can be negative (e.g., vacuum) relative to atmospheric pressure. In other examples, the pressure inside of the enclosure can be maintained to be positive relative to atmospheric pressure. For example, the adapter assembly can be sealed to prevent pressurized air within the enclosure from leaking around the exterior of the adapter assembly and also can be sealed to prevent the pressurized air within the enclosure from leaking through the interior of the adapter assembly when an exterior port of the adapter assembly is open (e.g., by removing a plug).

Figure 1:
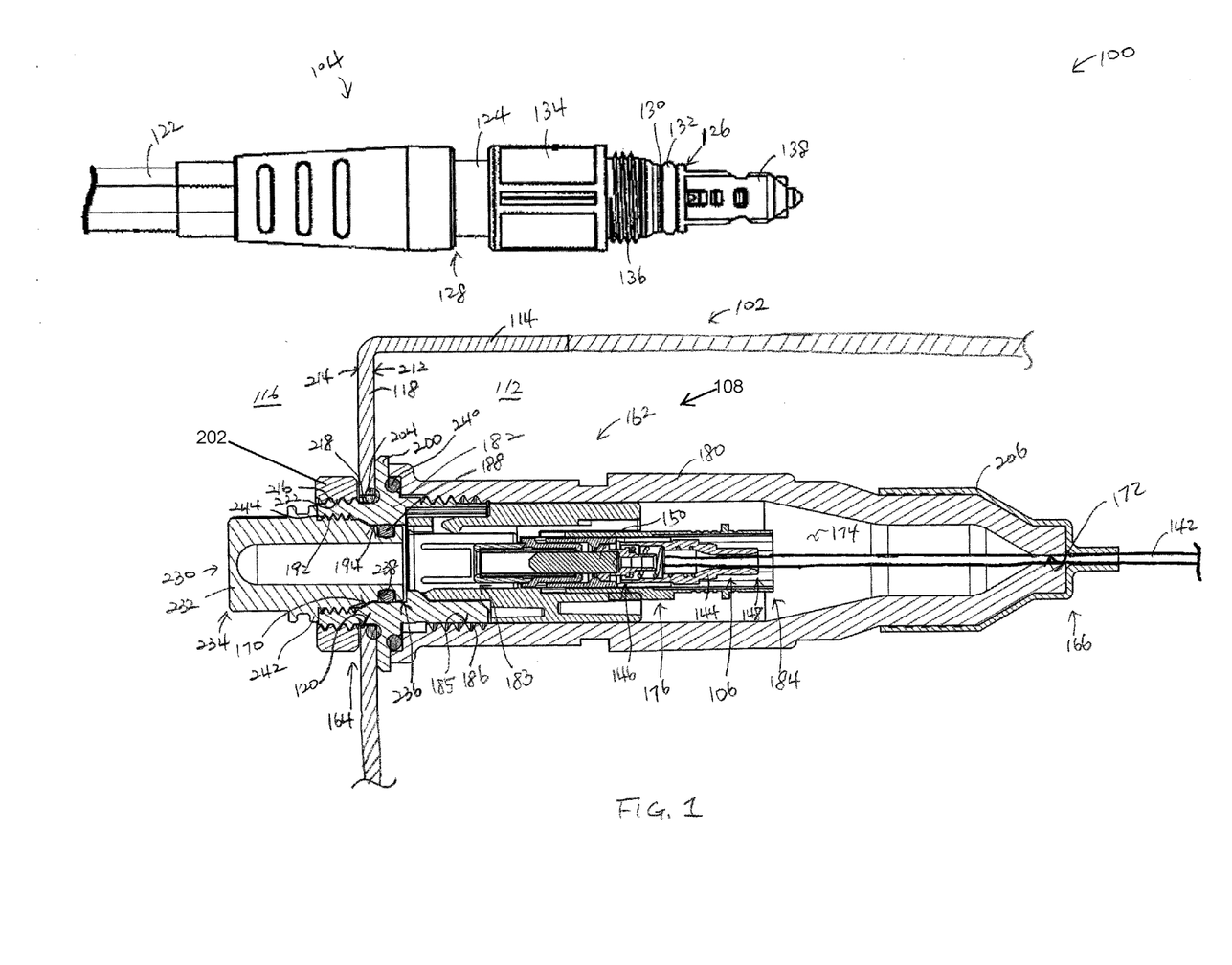
FIG. 1 illustrates an example fiber optic connection system.

FIG. 1 illustrates an example fiber optic connection system 100. The system 100 includes a communications enclosure 102, a first fiber optic connector 104, a second fiber optic connector 106, and a fiber optic cable adapter assembly 108.

The communications enclosure 102 has an interior 112 configured to contain various optical, mechanical and/or electrical components for splicing, passive optical splitting, wavelength division multiplexing, and other purposes. The interior 112 is defined by a housing 114 and is separate from an exterior 116 of the enclosure 102. The housing 114 has at least one mounting wall 118. The housing 114 includes at least one opening 120 formed in the mounting wall 118 and configured to receive and support the adapter assembly 108 therethrough. The interior 112 of the enclosure 102 is pressurized at a predetermined level, and remains substantially the same when the adapter assembly 108 mounts to the opening 120 of the enclosure 102 in accordance with the principles of the present disclosure. In some embodiments, the adapter assembly 108 is sufficiently sealed relative to the enclosure 102 such that an air leak rate from the enclosure does not exceed $10^{-6}$ cc/sec at 1 atmosphere of pressure differential even when an exterior port of the adapter assembly is open.

The first fiber optic connector 104 is an external male fiber optic connector terminating a first fiber optic cable 122. In some embodiments, the first fiber optic connector 104 is hardened or ruggedized. One example of the first fiber optic connector 104 is DLX™ fiber optic connectors available from TE Connectivity, Ltd. In the illustrated example, the first fiber optic connector 104 can include a main body 124 having a first end 126 and a second end 128 opposite to the first end 126 along a longitudinal axis thereof. A circumferential groove 130 is defined around the main body 124 to mount a sealing element 132 (e.g., an elastomeric O-ring or other sealing members) therewithin. A retention nut 134 is rotatably mounted on the main body 124 at a location between the sealing element 132 and the second end 128 and includes external threads 136 configured to engage internal threads 192 of a first port 170 of the adapter assembly 108. The retention nut 134 can be manually turned relative to the main body 124 about the longitudinal axis of the main body 124. The second end 128 of the main body 124 is adapted to receive and secure the first fiber optic cable 122. The first fiber optic connector 104 further includes a ferrule 138 mounted at the first end 126 of the main body 124. Other configurations of the first fiber optic connector 104 are also possible.

The second fiber optic connector 106 is an internal male fiber optic connector terminating a second fiber optic cable 142. In some embodiments, the second fiber optic connector 106 is non-ruggedized. For example, the second fiber optic connector 106 can be a conventional fiber optic connector, such as a Subscription Channel (SC) connector. In the illustrated example, the second fiber optic connector 106 includes a connector body 144 having a first end 146 and a second end 148 opposite to the first end 146. The connector body 144 is configured to be retained within the adapter assembly 108. The second fiber optic connector 106 includes a ferrule 150 mounted at the first end 146 of the connector body 144. The second end 148 of the connector body 144 is adapted to receive and secure the second fiber optic cable 142. In some embodiments, the second fiber optic connector 106 is preassembled with the adapter assembly 108 before the adapter assembly 108 mounts to the enclosure 102. Other configurations of the second fiber optic connector 106 are also possible.

The adapter assembly 108 mounts to the opening 120 of the enclosure 102 and configured to maintain the pressure within the enclosure 102 when mounting to the enclosure 102. In some embodiments, the adapter assembly 108 is hardened or ruggedized.

In some embodiments, the adapter assembly 108 includes an adapter housing 162 having a first housing end 164 and a second housing end 166 opposite to the first housing end 164. The first housing end 164 of the adapter housing 162 is adapted to receive the first fiber optic connector 104, and the second housing end 166 of the adapter housing 162 is adapted to support the second cable 142 of the second fiber optic connector 106. In some embodiments, the adapter housing 162 defines a first port 170, a second port 172, and a through-passage 174 extending between the first and second ports 170 and 172. The first port 170 is arranged at the first housing end 164 and configured to receive the first fiber optic connector 104. The second port 172 is arranged at the second housing end 166 and configured to support the second cable 142 of the second fiber optic connector 106. The adapter housing 162 can mount to the opening 120 of the mounting wall 118 of the enclosure 102 such that the first port 170 is open to the exterior 116 of the enclosure 102 and the second port 172 is arranged in the interior 112 of the enclosure 102.

The adapter assembly 108 further includes an adapter module 176 disposed within the through-passage 174 thereof and configured to couple the first fiber optic connector 104 and the second fiber optic connector 106. In some embodiments, the second fiber optic connector 106 is preassembled with the adapter module 176 through the second port 172 of the adapter housing 162 before the adapter housing 162 mounts to the opening 120 of the enclosure 102.

In some embodiments, the adapter module 176 has a first module end 183 and a second module end 184 opposite to the first module end 183. In some embodiments, the ferrule 150 of the second fiber optic connector 106 is positioned within the second module end 184 of the adapter module 176 before the adapter assembly 108 mounts to the enclosure 102. Once the adapter assembly 108 is installed to the enclosure 102, the first fiber optic connector 104 is inserted into the first port 170 of the adapter assembly 108 so that the ferrule 138 of the first fiber optic connector 104 is received within the second module end 184 of the adapter module 176 to establish an optical connection between the first fiber optic connector 104 and the second fiber optic connector 106.

With continued reference to FIG. 1, the adapter housing 162 can include an housing body 180 and a housing end piece 182 mounting to the housing body 180 at the first housing end 164 of the adapter housing 162. The housing body 180 defines at least partially the through-passage 174 and the second port 172 at the second housing end 166. The housing end piece 182 defines the first port 170 at the first housing end 164. The housing body 180 is configured to sealingly secure the housing end piece 182 at the first housing end 164. In some embodiments, the housing body 180 has internal threads 185 at or adjacent the first housing end 164, and the housing end piece 182 has exterior threads 186 corresponding to the internal threads 185 of the housing body 180, such that the housing end piece 182 is threadedly engaged with the housing body 180 at the first housing end 164. A seal element 188 is disposed between the housing body 180 and the housing end piece 182 to environmentally seal the through-passage 174 of the adapter housing 162, which is defined when the housing body 180 and the housing end piece 182 are coupled, against the interior 112 of the enclosure 102. Examples of the seal element 188 include an elastomeric O-ring or other sealing members.

As described above, the housing end piece 182 defines the first port 170 open to the exterior 116 of the enclosure 102 to receive the first fiber optic connector 104 from the exterior 116 of the enclosure 102. The housing end piece 182 includes internal threads 192 configured to engage the external threads 136 of the retention nut 134 of the first fiber optic connector 106. The first fiber optic connector 106 is inserted into the first port 170 and secured therein by the threaded engagement. The housing end piece 182 also includes an inner sealing surface 194 on which the sealing element 132 of the first fiber optic connector 104 seats when the first fiber optic connector 104 is secured into the first port 170 of the housing end piece 182.

With continued reference to FIG. 1, the adapter assembly 108 includes a mounting mechanism for sealingly securing the adapter assembly 108 to the opening 120 of the enclosure 102 and maintaining the pressure at the interior 112 of the enclosure 102. The adapter assembly 108 includes a mounting flange 200, a mounting nut 202, an enclosure seal element 204, and a second port seal element 206.

In the illustrated example of FIG. 1, the mounting flange 200 is circumferentially formed on the housing end piece 182. The mounting flange 200 of the housing end piece 182 is configured to abut an inner surface 212 of the mounting wall 118 when the adapter housing 162 (e.g., the housing end piece 182) is inserted through the opening 120 of the mounting wall 118. The housing end piece 182 has external threads 216 that are arranged at the exterior 116 of the enclosure 102 when the housing end piece 182 mounts to the opening 120 of the mounting wall 118 of the enclosure 102. The external threads 216 of the housing end piece 182 are configured to threadedly engage the mounting nut 202 as described below. The housing end piece 182 has an enclosure sealing groove 218 defined between the mounting flange 200 and the external threads 216. The enclosure sealing groove 218 is arranged adjacent the opening 120 such that the enclosure seal element 204 is disposed between the opening 120 and the enclosure sealing groove 218 when the adapter housing 162 mounts to the opening 120 of the mounting wall 118.

The mounting nut 202 is configured to engage a portion of the adapter housing 162 to secure the adapter housing 162 to the mounting wall 118 of the enclosure 102. In the illustrated example, the mounting nut 202 has internal threads 222 corresponding to the external threads 216 of the housing end piece 182. The mounting nut 202 can be screwed onto the external threads 216 of the housing end piece 182 to sandwich the mounting wall 118 of the enclosure 102 between the mounting flange 200 and the mounting nut 202.

The enclosure seal element 204 is disposed around the opening 120 of the enclosure 102 between the mounting flange 200 and the mounting nut 202 to seal the adapter housing 162 around the opening 120 of the enclosure 102. Examples of the enclosure seal element 204 include an elastomeric O-ring or other sealing members. In some embodiments, the enclosure seal element 204 operates to maintain an air leak rate from the interior 112 of the enclosure 102 not to exceed $10^{-6}$ cc/sec at one atmosphere of pressure differential.

The second port seal element 206 is disposed around the second cable 142 of the second fiber optic connector 106 at the second port 172 of the adapter housing 162 to seal the adapter housing 162 from the interior 112 of the enclosure 102. In some embodiments, the second port seal element 206 includes heat shrinkable materials that can be placed around the outer jacket of the second fiber optic cable 142 and around the outer surface of the adapter housing 162 adjacent the second housing end 166 (e.g., adjacent the second port 172). Examples of heat shrinkable materials include heat shrinkable tubes, heat shrinkable caps, heat shrinkable sleeves, or heat shrink wrap tapes. These heat shrinkable materials can provide an improved moisture barrier for preventing moisture from entering the through-passage 174 of the adapter housing 162.

In other embodiments, the second port seal element 206 includes adhesive materials that can be applied within the second port 172 around the second fiber optic cable 142 to secure the second fiber optic cable 142 within the second port 172. In addition, or alternatively, the adhesive materials can be applied to a portion of the through-passage 174 of the adapter housing 162 adjacent the second housing end 166 (e.g., adjacent the second port 172). Examples of adhesive materials include an epoxy-based sealant and other adhering materials.

With continued reference to FIG. 1, the adapter assembly 108 can further include a plug 230 configured to be received into the first port 170 of the adapter housing 162 to prevent dust, water or other contaminants from entering the interior of the adapter housing 162. In some embodiments, the plug 230 includes a plug body 232 having a first plug end 234 and a second plug end 236 opposite to the first plug end 234. The first plug end 234 is configured to be manually grasped. The second plug end 236 is configured for insertion into the first port 170 of the adapter housing 162. A circumferential groove 238 is defined around the exterior of the plug body 232. A sealing element 240 (e.g., a resilient O-ring) is mounted within the circumferential groove 238. The plug body 232 includes an annular flange 242 that is spaced from the circumferential groove 238. External threads 244 are defined about the exterior of the plug body 232 between the circumferential groove 238 and the annular flange 242. In use, the second plug end 236 of the plug body 232 is inserted into the first port 170 until the external threads 244 of the plug 230 engage the internal threads 192 of the first port 170. The plug 230 is then manually turned to thread the external threads 244 of the plug 230 into the internal threads 192 of the first port 170 until the plug 230 is fully threaded into the first port 170 and the sealing element 240 of the plug 230 engages the inner sealing surface 194 of the housing end piece 182.

To make a fiber optic connection between the first and second fiber optic connectors 104 and 106, the plug 230 is removed from the first port 170 by unthreading the plug 230 and axially pulling the plug 230 from the first port 170. Thereafter, the first end 126 of the first fiber optic connector 104 is inserted into the first port 170 until the ferrule 138 is inserted into the adapter module 176 (e.g., a ferrule alignment sleeve thereof). The retention nut 134 of the first fiber optic connector 104 is then threaded into the internal threads 192 of the first port 170 to provide secure retention of the first fiber optic connector 104 within the first port 170. With the ferrule 138 of the first fiber optic connector 104 inserted within the ferrule alignment sleeve of the adapter module 176, a fiber retained within the ferrule 138 is placed in coaxial alignment with an optical fiber secured within the ferrule 150 of the second fiber optic connector 106. This alignment between the optical fibers allows an optical transmission to pass from fiber to fiber within the adapter module 176. Additionally, the sealing element 132 forms a circumferential environmental seal through engagement with the annular sealing surface 194 of the housing end piece 182.

In some embodiments, the fiber optic connection system 100 can include at least some of the structures, features and operations disclosed in the U.S. Pat. No. 7,686,519, titled HARDENED FIBER OPTIC HOUSING AND CABLE ASSEMBLY, filed on Jun. 18, 2007, which is hereby incorporated by reference in its entirety.

Figure 2:
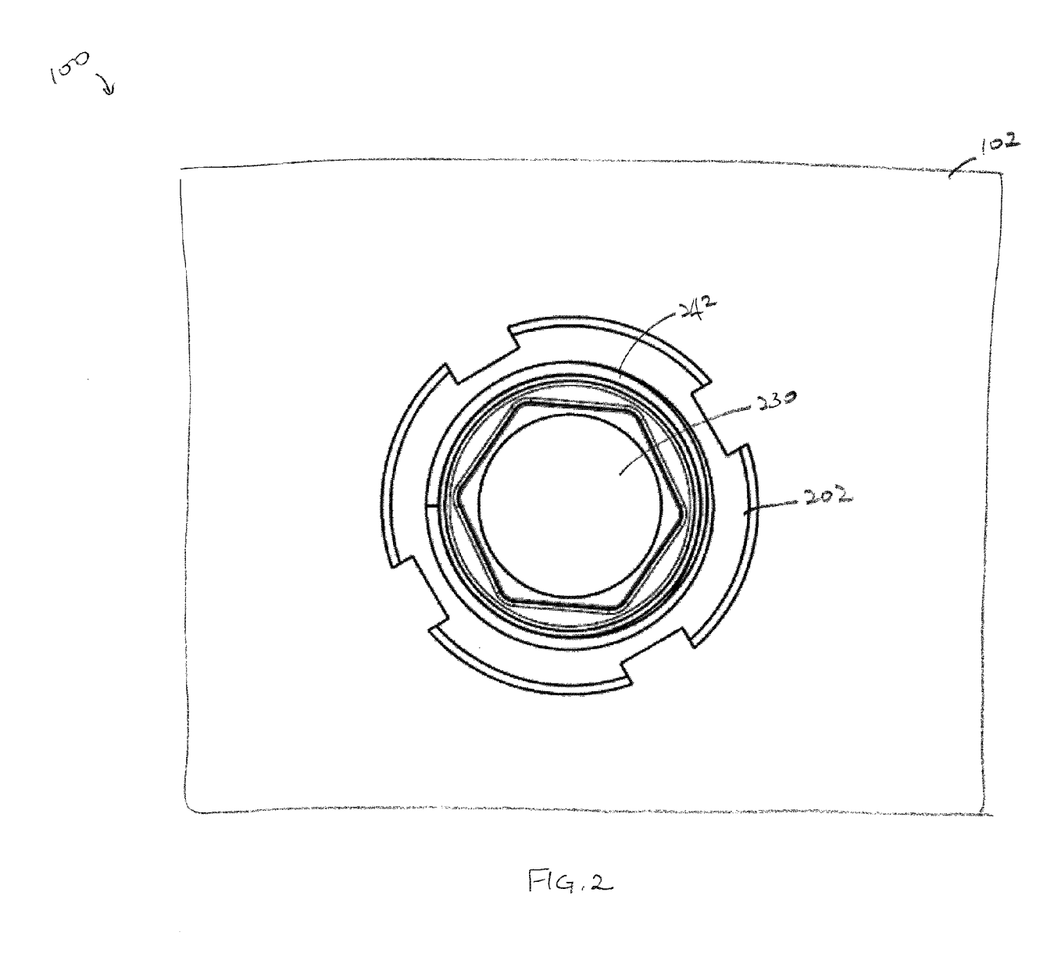
FIG. 2 is a side view of the fiber optic connection system of FIG. 1, illustrating an adapter assembly mounted to a telecommunications enclosure.

FIG. 2 is a side view of the fiber optic connection system 100 of FIG. 1, illustrating the adapter assembly 108 mounted to the enclosure 102. In particular, the plug 230 and the mounting nut 202 are primarily shown.

Figure 3:
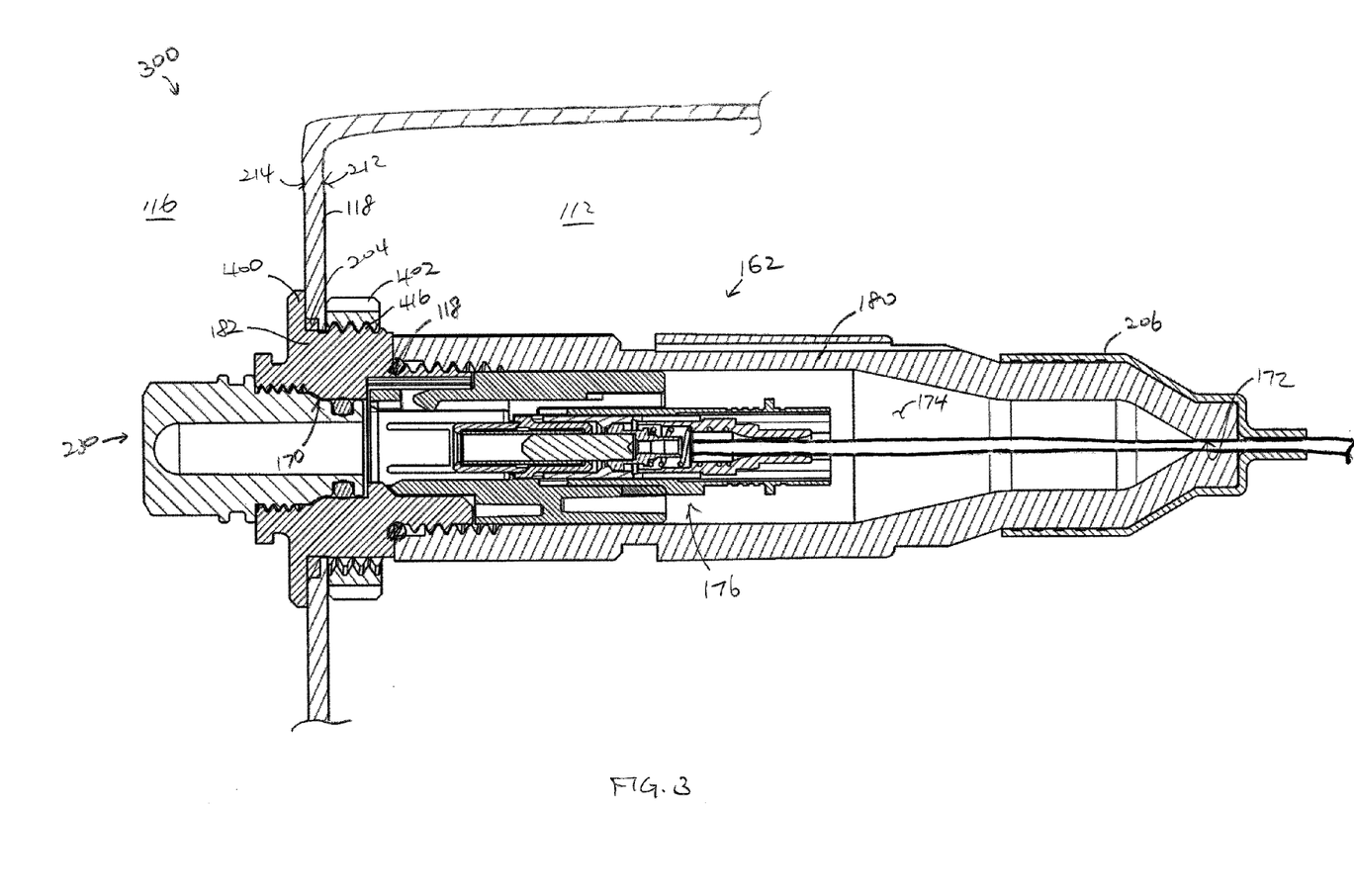
FIG. 3 illustrates another example fiber optic connection system.

FIG. 3 illustrates another example fiber optic connection system 300. As many of the concepts and features are similar to the fiber optic connection system 100 shown in FIG. 1, the description for the system 100 is hereby incorporated by reference for the system 300. Where like or similar features or elements are shown, the same reference numbers will be used where possible. The following description for the system 300 will be limited primarily to the differences between the system 100 and the system 300.

The structures and features of the system 300 are similar to those of the system 100 except that a mounting mechanism of the system 300 is modified from the mounting mechanism of the system 100. As in the system 100, the mounting mechanism of the system 300 includes a mounting flange 400, a mounting nut 402, the enclosure seal element 204, and the second port seal element 206. In particular, the mounting flange 400 and the mounting nut 402 are modified from the mounting flange 200 and the mounting nut 202.

In this example, the mounting flange 400 is circumferentially formed on the housing end piece 182 to abut an outer surface 214 of the mounting wall 118 when the adapter housing 162 (e.g., the housing end piece 182) is inserted through the opening 120 of the mounting wall 118. The housing end piece 182 has external threads 416 that are arranged at the interior 112 of the enclosure 102 when the housing end piece 182 mounts to the opening 120 of the mounting wall 118 of the enclosure 102. The external threads 416 of the housing end piece 182 are configured to engage the mounting nut 402. The mounting nut 402 are similar to the mounting nut 202 except that the mounting nut 402 is screwed onto the external threads 416 of the housing end piece 182 from the interior 112 of the enclosure 102. Other configurations of the housing end piece 182 and the associated elements are not modified.

Figure 4:
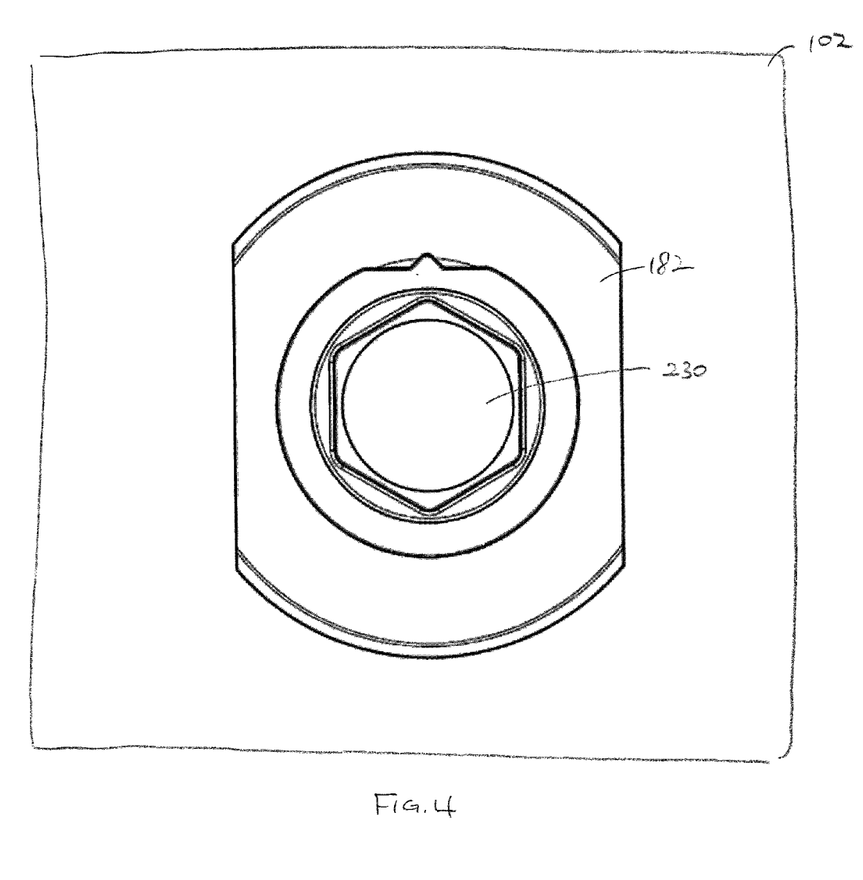
FIG. 4 is a side view of the fiber optic connection system of FIG. 3, illustrating an adapter assembly mounted to a telecommunications enclosure.

FIG. 4 is a side view of the fiber optic connection system 300 of FIG. 3, illustrating the adapter assembly 108 mounted to the enclosure 102. In particular, the plug 230 and the housing end piece 182 are primarily shown.

Figure 5:
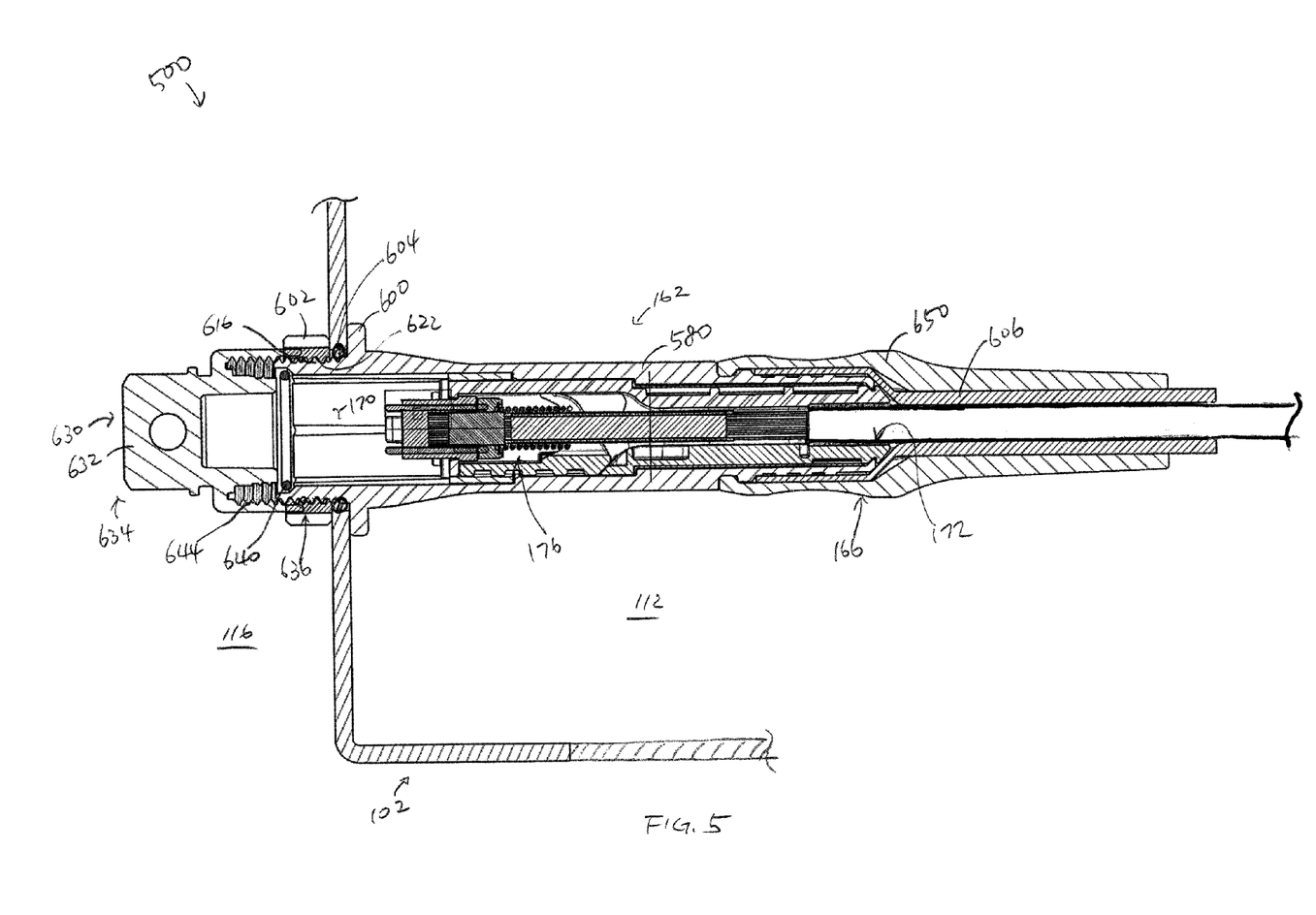
FIG. 5 illustrates yet another fiber optic connection system.

FIG. 5 illustrates yet another fiber optic connection system 500. The system 500 can be used for hardened multi-fiber optical connectors (HMFOC). As many of the concepts and features are similar to the fiber optic connection system 100 shown in FIG. 1, the description for the system 100 is hereby incorporated by reference for the system 500. Where like or similar features or elements are shown, the same reference numbers will be used where possible. The following description for the system 500 will be limited primarily to the differences between the system 100 and the system 500.

Unlike the adapter housing 162 of the system 100, the adapter housing 162 of the system 500 includes a single housing body 580 extending between the first and second housing ends 164 and 166. The housing body 580 defines the first port 170 at the first housing end 164, the second port 172 at the second housing end 166, and the through-passage 174 therebetween. The housing body 580 has second external threads 592 formed at the first housing end 164 and configured to secure the plug 630, as described below.

In this example, a mounting mechanism of the adapter assembly 108 can include a mounting flange 600, a mounting nut 602, an enclosure seal element 604, and a second port seal element 606.

The mounting flange 600 is circumferentially formed on the housing body 580 adjacent the first housing end 164 (e.g., adjacent the first port 170). The mounting flange 600 is configured to abut the inner surface 212 of the mounting wall 118 when the adapter housing 162 is inserted through the opening 120 of the mounting wall 118. The housing body 580 has first external threads 616 that are arranged at the exterior 116 of the enclosure 102 when the housing body 580 mounts to the opening 120 of the mounting wall 118 of the enclosure 102. The first external threads 616 of the housing body 580 are configured to threadedly engage the mounting nut 602, as described below.

The mounting nut 602 is configured to engage a portion of the housing body 580 at the first housing end 164 to secure the adapter housing 168 to the mounting wall 118 of the enclosure 102. In the illustrated example, the mounting nut 602 has internal threads 622 corresponding to the first external threads 616 of the housing body 580. The mounting nut 602 can be screwed onto the first external threads 616 of the housing body 580 to sandwich the mounting wall 118 of the enclosure 102 between the mounting flange 600 and the mounting nut 602.

The enclosure seal element 604 is disposed around the opening 120 of the enclosure 102 between the mounting flange 600 and the mounting nut 602 to seal the adapter housing 162 around the opening 120 of the enclosure 102. Examples of the enclosure seal element 604 include an elastomeric O-ring or other sealing members. In some embodiments, the enclosure seal element 604 operates to maintain an air leak rate from the interior 112 of the enclosure 102 not to exceed $10^{-6}$ cc/sec at one atmosphere of pressure differential.

The second port seal element 606 is disposed around the second fiber optic connector 106 at the second port 172 of the adapter housing 162 to seal the adapter housing 162 from the interior 112 of the enclosure 102. In some embodiments, the second port seal element 206 includes heat shrinkable materials that can be placed around the outer jacket of the second fiber optic cable 142 and around the outer surface of the adapter housing 162 adjacent the second housing end 166 (e.g., adjacent the second port 172). Examples of heat shrinkable materials include heat shrinkable tubes, heat shrinkable caps, heat shrinkable sleeves, or heat shrink wrap tapes. These heat shrinkable materials can provide an improved moisture barrier for preventing moisture from entering the through-passage 174 of the adapter housing 162. In other embodiments, the second port seal element 606 includes adhesive materials that can be applied within the second port 172 around the second fiber optic cable 142 to secure the second fiber optic cable 142 within the second port 172. In addition, or alternatively, the adhesive materials can be applied to a portion of the through-passage 174 of the adapter housing 162 adjacent the second housing end 166

(e.g., adjacent the second port 172). Examples of adhesive materials include an epoxy-based sealant and other adhering materials.

In this example, the adapter assembly 108 can include a strain relief boot 650 for providing strain relief to the second fiber optic cable 142 received within the housing body 580 through the second port 172. The strain relief boot 650 engages a portion of the second fiber optic cable 142 and a portion of the housing body 580 at the second housing end 166. As illustrated, the strain relief boot 650 can be provided at least partially on the second port seal element 606 disposed around the second fiber optic cable 142.

With continued reference to FIG. 5, the adapter assembly 108 can further include a plug 630 configured to be received into the first port 170 of the adapter housing 162 to prevent dust, water or other contaminants from entering the interior of the adapter housing 162. The plug 630 is configured similarly to the plug 230. In some embodiments, the plug 630 includes a plug body 632 having a first plug end 634 and a second plug end 636 opposite to the first plug end 634. The first plug end 634 is configured to be manually grasped. The second plug end 636 is configured for insertion into the first port 170 of the adapter housing 162. The plug body 632 defines internal threads 644 corresponding to the second external threads 592 formed on the housing body 580 at the first housing end 164. In use, the second plug end 636 of the plug body 632 is inserted into the first port 170 until the internal threads 644 of the plug 630 engage the second external threads 592 of the first port 170. The plug 630 is then manually turned to thread the internal threads 644 of the plug 630 into the second external threads 592 of the first port 170 until the plug 630 is fully threaded into the first port 170 and a sealing element 640 of the plug 630 is disposed between the plug 630 and the first port 170 of the adapter housing 162.

In some embodiments, the fiber optic connection system 500 can include at least some of the structures, features and operations disclosed in the U.S. Pat. No. 7,744,288, titled HARDENED FIBER OPTIC CONNECTOR COMPATIBLE WITH HARDENED AND NON-HARDENED FIBER OPTIC ADAPTERS, filed on Sep. 3, 2008, and in the PCT application No. PCT/US2010/062526, titled MULTI-FIBER FIBER OPTIC CONNECTOR, filed on Oct. 30, 2012, the entireties of which are hereby incorporated by reference.

Figure 6:
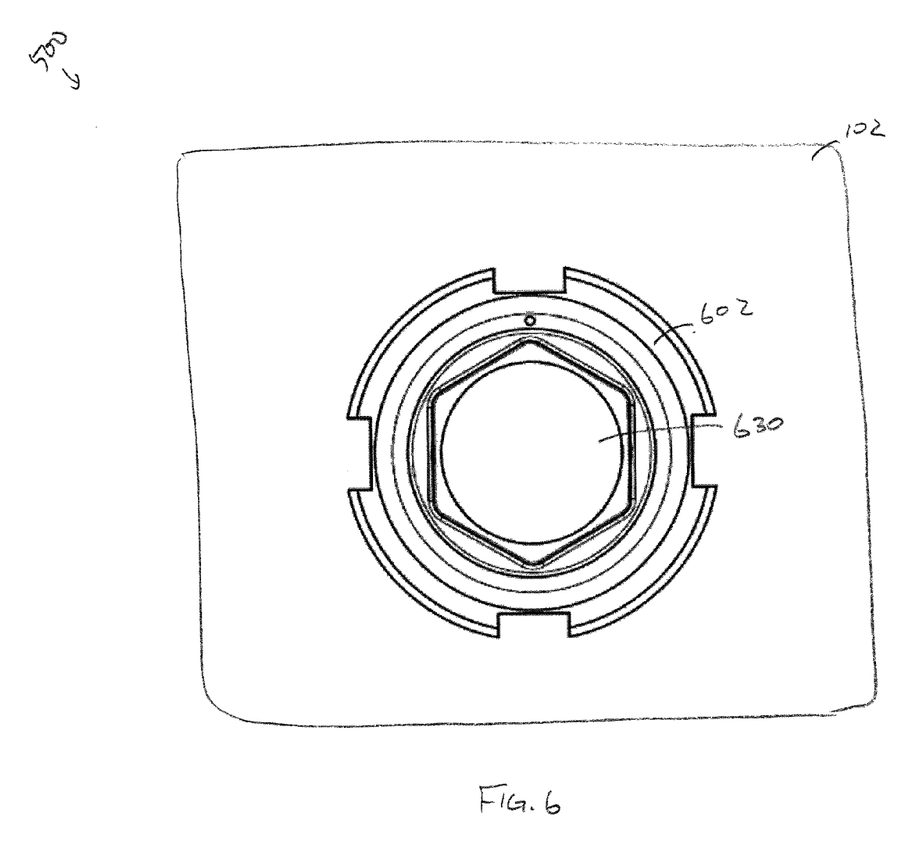
FIG. 6 is a side view of the fiber optic connection system of FIG. 5, illustrating an adapter assembly mounted to a telecommunications enclosure.

FIG. 6 is a side view of the fiber optic connection system 500 of FIG. 5, illustrating the adapter assembly 108 mounted to the enclosure 102. In particular, the plug 630 and the mounting nut 602 are primarily shown.

Figure 7:
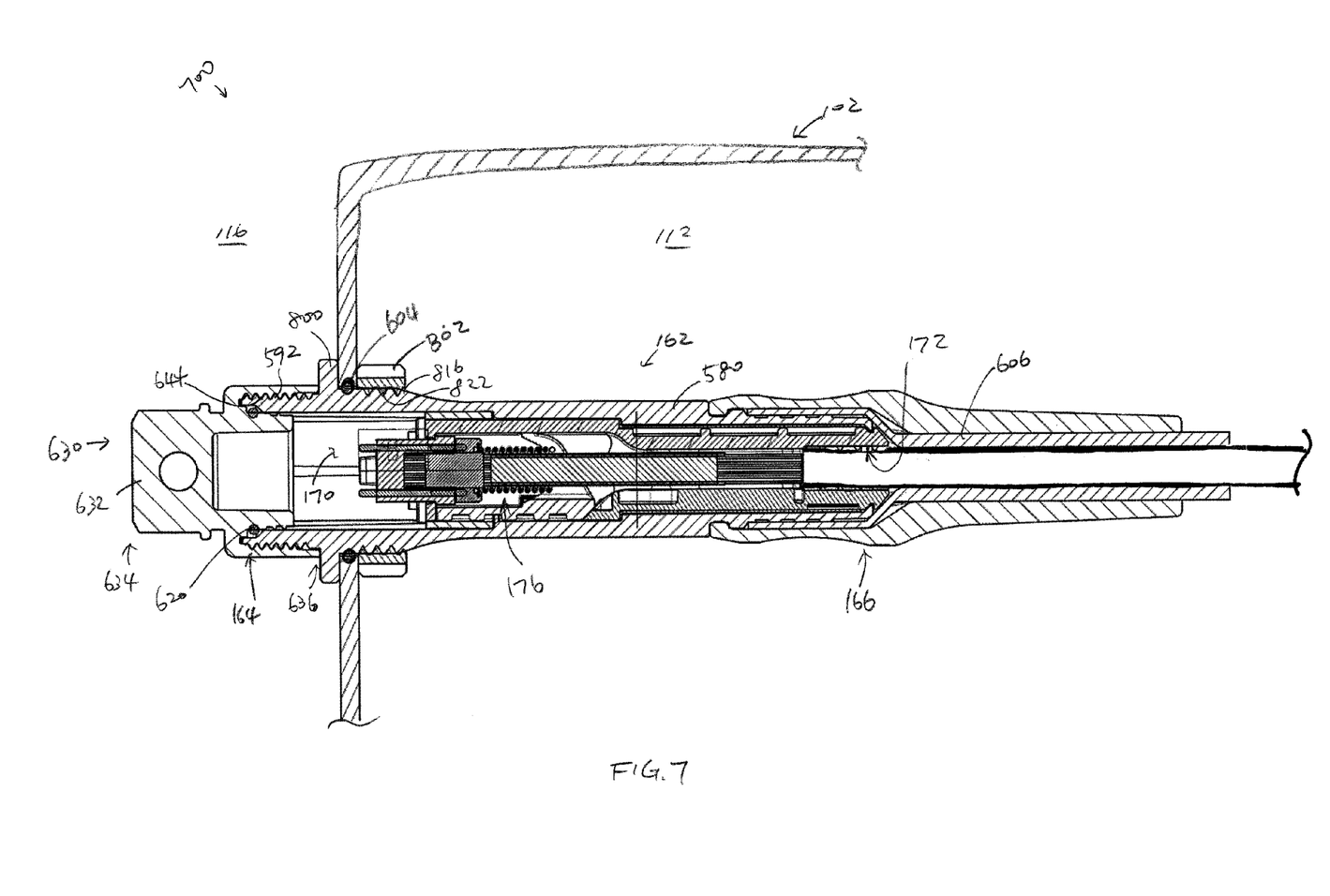
FIG. 7 illustrates yet another example fiber optic connection system.

FIG. 7 illustrates yet another example fiber optic connection system 700. As many of the concepts and features are similar to the fiber optic connection system 500 shown in FIG. 5, the description for the system 500 is hereby incorporated by reference for the system 700. Where like or similar features or elements are shown, the same reference numbers will be used where possible. The following description for the system 700 will be limited primarily to the differences between the system 500 and the system 700.

The structures and features of the system 700 are similar to those of the system 500 except that a mounting mechanism of the system 700 is modified from the mounting mechanism of the system 500. As in the system 500, the mounting mechanism of the system 700 includes a mounting flange 800, a mounting nut 802, the enclosure seal element 604, and the second port seal element 606. In particular, the mounting flange 800 and the mounting nut 802 are modified from the mounting flange 600 and the mounting nut 602.

In this example, the mounting flange 800 is circumferentially formed on the housing body 580 at the first housing end 164 to abut the outer surface 214 of the mounting wall 118 when the adapter housing 162 (e.g., the housing body 580) is inserted through the opening 120 of the mounting wall 118. The housing body 580 has first external threads 816 that are arranged at the interior 112 of the enclosure 102 when the housing body 580 mounts to the opening 120 of the mounting wall 118 of the enclosure 102. The first external threads 816 of the housing body 580 are configured to engage the mounting nut 802. The mounting nut 802 are similar to the mounting nut 602 except that the mounting nut 802 is screwed onto the first external threads 816 of the housing body 580 from the interior 112 of the enclosure 102. Other configurations of the housing body 580 and the associated elements are not modified.

Figure 8:
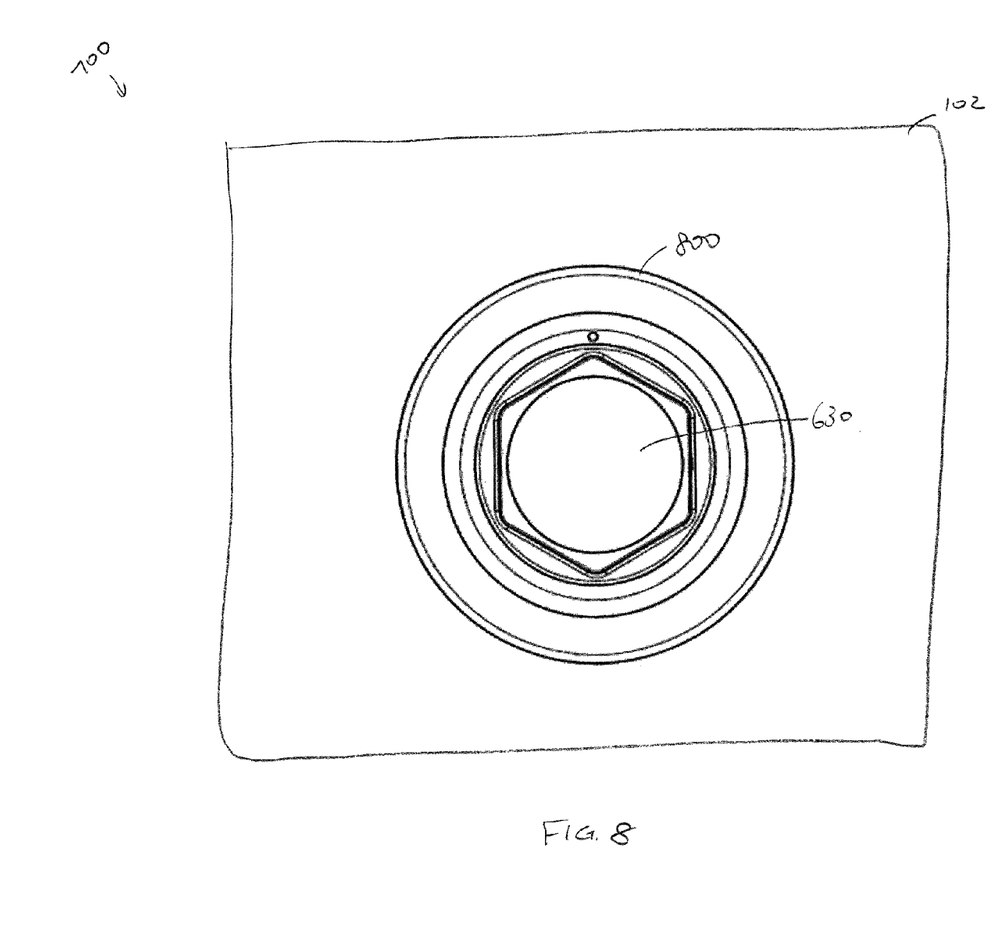
FIG. 8 is a side view of the fiber optic connection system of FIG. 7, illustrating an adapter assembly mounted to a telecommunications enclosure.

FIG. 8 is a side view of the fiber optic connection system 700 of FIG. 7, illustrating the adapter assembly 108 mounted to the enclosure 102. In particular, the plug 630 and the mounting nut 802 are primarily shown.

The various examples and teachings described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:
1. A fiber optic cable adapter assembly comprising:
an adapter housing defining a first port, a second port, and a through-passage extending between the first port and the second port, the adapter housing configured to mount to an opening formed in a mounting wall of a pressurized enclosure such that the first port is open to an exterior of the enclosure to receive a first fiber optic connector from the exterior of the enclosure and the second port is arranged in the interior of the enclosure;
an adapter module disposed within the through-passage and configured to couple the first fiber optic connector and a second fiber optic connector within the adapter housing, the second fiber optic connector being preassembled with the adapter module through the second port of the adapter housing before the adapter housing mounts to the opening of the mounting wall, the second fiber optic connector being fully received within the adapter housing;
a mounting flange formed on the adapter housing and configured to abut one of an inner surface and an outer surface of the mounting wall of the pressurized enclosure when the adapter housing mounts to the opening of the mounting wall;
a mounting nut engaging a portion of the adapter housing to sandwich the mounting wall of the pressurized enclosure between the mounting flange and the mounting nut;
an enclosure seal element disposed around the opening of the mounting wall between the mounting flange and the mounting nut to seal the adapter housing around the opening of the enclosure; and
a second port seal element disposed around a fiber optic cable of the second fiber optic connector at the second port to seal the adapter housing from the interior of the enclosure at the second port of the adapter housing,
wherein the enclosure seal element and the second port seal element are configured to maintain a positive or negative pressure within the pressurized enclosure relative to atmospheric pressure.

2. The fiber optic cable adapter assembly according to claim 1, wherein the adapter housing includes a housing end piece and an housing body, the housing end piece defining the first port and including the mounting flange, and the housing body sealingly engaging the housing end piece and defining the second port and the through-passage.

3. The fiber optic cable adapter assembly according to claim 2, wherein:
the mounting nut has internal threads; and
the housing end piece has external threads corresponding to the internal threads of the mounting nut such that the mounting nut is screwed onto the external threads of the housing end piece.

4. The fiber optic cable adapter assembly according to claim 1, wherein the enclosure seal element and the second port seal element are configured to maintain an air leak rate from the enclosure not to exceed $10^{-6}$ cc/sec at one atmosphere of pressure differential.

5. The fiber optic cable adapter assembly according to claim 1, wherein the enclosure seal element is an elastomeric O-ring.

6. The fiber optic cable adapter assembly according to claim 1, wherein the second port seal element includes heat shrinkable materials.

7. The fiber optic cable adapter assembly according to claim 1, wherein the second port seal element includes adhesive materials.

8. The fiber optic cable adapter assembly according to claim 7, wherein the adhesive materials include an epoxy-based sealant.

9. A fiber optic connection system comprising:
a pressurized enclosure having a mounting wall, the mounting wall defining an opening;
a first fiber optic connector terminating a first fiber optic cable;
a second fiber optic connector terminating a second fiber optic cable; and
an adapter assembly comprising:
an adapter housing defining a first port, a second port, and a through-passage extending between the first port and the second port, the adapter housing configured to mount to the opening in the mounting wall of the enclosure such that the first port is open to an exterior of the enclosure to receive the first fiber optic connector from the exterior of the enclosure and the second port is arranged in the interior of the enclosure;
an adapter module disposed within the through-passage and configured to couple the first fiber optic connector and the second fiber optic connector within the adapter housing, the second fiber optic connector being preassembled with the adapter module through the second port of the adapter housing before the adapter housing mounts to the opening of the mounting wall, the second fiber optic connector being fully received with the adapter housing;
a mounting flange formed on the adapter housing and configured to abut one of an inner surface and an outer surface of the mounting wall of the pressurized enclosure when the adapter housing mounts to the opening of the mounting wall;
a mounting nut engaging a portion of the adapter housing to sandwich the mounting wall of the pressurized enclosure between the mounting flange and the mounting nut;
an enclosure seal element disposed around the opening of the mounting wall between the mounting flange and the mounting nut to seal the adapter housing around the opening of the enclosure; and
a second port seal element disposed around the second fiber optic cable of the second fiber optic connector at the second port to seal the adapter housing from the interior of the enclosure at the second port of the adapter housing,
wherein the enclosure seal element and the second port seal element are configured to maintain a positive or negative pressure within the pressurized enclosure relative to atmospheric pressure.

10. The fiber optic connection system according to claim 9, wherein the adapter housing includes a housing end piece and an housing body, the housing end piece defining the first port and including the mounting flange, and the housing body sealingly engaging the housing end piece and defining the second port and the through-passage.

11. The fiber optic connection system according to claim 10, wherein:
the mounting nut has internal threads; and
the housing end piece has external threads corresponding to the internal threads of the mounting nut such that the mounting nut is screwed onto the external threads of the housing end piece.

12. The fiber optic connection system according to claim 9, wherein the enclosure seal element and the second port seal element are configured to maintain an air leak rate from the enclosure not to exceed $10^{-6}$ cc/sec at one atmosphere of pressure differential.

13. The fiber optic connection system according to claim 9, wherein the enclosure seal element is an elastomeric O-ring.

14. The fiber optic connection system according to claim 9, wherein the second port seal element includes heat shrinkable materials.

15. The fiber optic connection system according to claim 9, wherein the second port seal element includes adhesive materials.

16. The fiber optic connection system according to claim 15, wherein the adhesive materials include an epoxy-based sealant.

* * * * *